United States Patent
Versteyhe et al.

(10) Patent No.: US 10,088,026 B2
(45) Date of Patent: Oct. 2, 2018

(54) BALL TYPE CVT WITH OUTPUT COUPLED POWERPATHS

(71) Applicant: Dana Limited, Maumee, OH (US)

(72) Inventors: Mark R. J. Versteyhe, Oostkamp (BE); Matthias W. J. Byltiauw, Roeselare (BE)

(73) Assignee: Dana Limited, Maumee, OH (US)

( * ) Notice: Subject to any disclaimer, the term of this patent is extended or adjusted under 35 U.S.C. 154(b) by 0 days.

(21) Appl. No.: 15/423,131

(22) Filed: Feb. 2, 2017

(65) Prior Publication Data

US 2017/0184188 A1 Jun. 29, 2017

Related U.S. Application Data (62) Division of application No. 14/425,600, filed as application No. PCT/US2013/057868 on Sep. 3, 2013, now Pat. No. 9,599,204.

(60) Provisional application No. 61/779,687, filed on Mar. 13, 2013, provisional application No. 61/697,917, filed on Sep. 7, 2012.

(51) Int. Cl.
  *F16H 37/08* (2006.01)
  *F16H 15/28* (2006.01)

(52) U.S. Cl.
  CPC .......... *F16H 37/086* (2013.01); *F16H 15/28* (2013.01); *F16H 2037/0873* (2013.01)

(58) Field of Classification Search
  CPC .................. F16H 37/086; F16H 15/28; F16H 2037/0873; F16H 37/0853
  See application file for complete search history.

(56) References Cited

U.S. PATENT DOCUMENTS

| | | |
|---|---|---|
| 1,063,244 A | 6/1913 | Dieterich |
| 1,215,969 A | 2/1917 | Murray |
| (Continued) | | |

FOREIGN PATENT DOCUMENTS

| | | |
|---|---|---|
| AU | 2011224083 A1 | 10/2011 |
| CN | 101392825 A | 3/2009 |
| (Continued) | | |

OTHER PUBLICATIONS

Fallbrook Technologies Inc. NuVinci® Technology, Feb. 26, 2013; [Retrieved from internet on Jun. 5, 2014].: URL:https://web.archive.org/web/20130226233109/http://www.fallbrooktech.com/nuvinci-technology.

(Continued)

*Primary Examiner* — Jacob S. Scott
*Assistant Examiner* — Tinh Dang
(74) *Attorney, Agent, or Firm* — Marshall & Melhorn, LLC (57) ABSTRACT

Systems, devices, and methods are provided for the transmission of power in motor vehicles. Power can be transmitted in a smoother and more efficient manner, with smaller and even less mechanical components, by splitting torque into two or more torque paths. A power transmission apparatus comprises a power input shaft, a planetary gear set coupled to the power input shaft, and a variator, such as a continuously variable transmission (CVT), coupled to the gear set. The various components of the planetary gear set and the variator are arranged such that torque is split between two or more torque paths and then recombined before power is output to a gear box and a differential of the motor vehicle.

11 Claims, 4 Drawing Sheets

(56) References Cited

U.S. PATENT DOCUMENTS

| | | |
|---|---|---|
| 1,526,140 A | 2/1925 | Gruver |
| 2,019,006 A | 10/1935 | Ferrari |
| 2,060,884 A | 11/1936 | Madle |
| 2,148,759 A | 2/1939 | Grand |
| 2,405,201 A | 8/1946 | Franck |
| 2,660,897 A | 12/1953 | Neidhart et al. |
| 2,729,118 A | 1/1956 | Emslie |
| 2,931,235 A | 4/1960 | Hayward |
| 3,203,278 A | 8/1965 | General |
| 3,376,633 A | 4/1968 | Wesley |
| 3,407,687 A | 10/1968 | Hayashi |
| 3,470,720 A | 10/1969 | Eklund et al. |
| 3,505,718 A | 4/1970 | Carlstrom |
| 3,583,060 A | 6/1971 | Sigmans |
| 3,688,600 A | 9/1972 | Leonard |
| 3,765,270 A | 10/1973 | Lemieux |
| 3,774,280 A | 11/1973 | Eklund et al. |
| 3,831,245 A | 8/1974 | Amos |
| 3,894,559 A | 7/1975 | DePuy |
| 4,046,988 A | 9/1977 | Okuda et al. |
| 4,056,988 A | 11/1977 | Kubo et al. |
| 4,187,709 A | 2/1980 | Legate et al. |
| 4,226,140 A | 10/1980 | Gaasenbeek |
| 4,333,358 A | 6/1982 | Grattapaglia |
| 4,344,336 A | 8/1982 | Carriere |
| 4,360,090 A | 11/1982 | Wonn |
| 4,368,572 A | 1/1983 | Kanazawa et al. |
| 4,464,952 A | 8/1984 | Stubbs |
| 4,693,134 A | 9/1987 | Kraus |
| 4,731,044 A | 3/1988 | Mott |
| 4,756,211 A | 7/1988 | Fellows |
| 4,784,017 A | 11/1988 | Johnshoy |
| 4,856,371 A | 8/1989 | Kemper |
| 4,856,374 A | 8/1989 | Kreuzer |
| 4,950,208 A | 8/1990 | Tomlinson |
| 4,963,122 A | 10/1990 | Ryan |
| 4,963,124 A | 10/1990 | Takahashi et al. |
| 5,109,962 A | 5/1992 | Sato |
| 5,168,778 A | 12/1992 | Todd et al. |
| 5,217,412 A | 6/1993 | Indlekofer et al. |
| 5,230,670 A | 7/1993 | Hibi |
| 5,238,460 A | 8/1993 | Esaki et al. |
| 5,318,486 A | 6/1994 | Lutz |
| 5,390,759 A | 2/1995 | Gollner |
| 5,401,221 A | 3/1995 | Fellows et al. |
| 5,520,588 A | 5/1996 | Hall, III |
| 5,527,231 A | 6/1996 | Seidel et al. |
| 5,577,423 A | 11/1996 | Mimura |
| 5,599,251 A | 2/1997 | Beim et al. |
| 5,659,956 A | 8/1997 | Braginsky et al. |
| 5,683,322 A | 11/1997 | Meyerle |
| 5,726,353 A | 3/1998 | Matsuda et al. |
| 5,730,678 A | 3/1998 | Larkin |
| 5,766,105 A | 6/1998 | Fellows et al. |
| 5,776,028 A | 7/1998 | Matsuda et al. |
| 5,800,303 A | 9/1998 | Benford |
| 5,860,888 A | 1/1999 | Lee |
| 5,915,801 A | 6/1999 | Taga et al. |
| 5,961,415 A | 10/1999 | Justice et al. |
| 5,971,883 A | 10/1999 | Klemen |
| 5,996,226 A | 12/1999 | Gibbs |
| 6,009,365 A | 12/1999 | Takahara et al. |
| 6,036,616 A | 3/2000 | McCarrick et al. |
| 6,045,477 A | 4/2000 | Schmidt |
| 6,053,839 A | 4/2000 | Baldwin et al. |
| 6,059,685 A | 5/2000 | Hoge et al. |
| 6,071,208 A | 6/2000 | Koivunen |
| 6,080,080 A | 6/2000 | Bolz et al. |
| 6,083,135 A | 7/2000 | Baldwin et al. |
| 6,086,504 A | 7/2000 | Illerhaus |
| 6,089,287 A | 7/2000 | Welsh et al. |
| 6,095,942 A | 8/2000 | Yamaguchi et al. |
| 6,155,951 A | 12/2000 | Kuhn et al. |
| 6,217,474 B1 | 4/2001 | Ross et al. |
| 6,251,038 B1 | 6/2001 | Ishikawa et al. |
| 6,273,838 B1 | 8/2001 | Park |
| 6,342,026 B1 | 1/2002 | Takagi et al. |
| 6,358,178 B1 | 3/2002 | Wittkopp |
| 6,371,880 B1 | 4/2002 | Kam |
| 6,405,117 B1 | 6/2002 | Walenty et al. |
| 6,481,258 B1 | 11/2002 | Belinky |
| 6,554,735 B2 | 4/2003 | Kanazawa |
| 6,558,285 B1 | 5/2003 | Sieber |
| 6,585,619 B2 | 7/2003 | Henzler |
| 6,609,994 B2 | 8/2003 | Muramoto |
| 6,632,157 B1 | 10/2003 | Gierling et al. |
| 6,641,497 B2 | 11/2003 | Deschamps et al. |
| 6,645,106 B2 | 11/2003 | Goo |
| 6,689,012 B2 | 2/2004 | Miller et al. |
| 6,705,964 B2 | 3/2004 | Nagai et al. |
| 6,719,659 B2 | 4/2004 | Geiberger et al. |
| 6,723,016 B2 | 4/2004 | Sumi |
| 6,726,590 B2 | 4/2004 | Henzler et al. |
| 6,733,412 B2 | 5/2004 | Kumagai et al. |
| 6,752,696 B2 | 6/2004 | Murai et al. |
| 6,793,603 B2 | 9/2004 | Teraoka et al. |
| 6,849,020 B2 | 2/2005 | Sumi |
| 6,866,606 B2 | 3/2005 | Ooyama |
| 6,949,045 B2 | 9/2005 | Wafzig et al. |
| 6,979,275 B2 | 12/2005 | Hiraku et al. |
| 6,986,725 B2 | 1/2006 | Morscheck |
| 7,033,298 B2 | 4/2006 | Usoro et al. |
| 7,074,154 B2 | 7/2006 | Miller |
| 7,086,981 B2 | 8/2006 | Ali et al. |
| 7,104,917 B2 | 9/2006 | Klemen et al. |
| 7,128,681 B2 | 10/2006 | Sugino et al. |
| 7,160,220 B2 | 1/2007 | Shinojima et al. |
| 7,186,199 B1 | 3/2007 | Baxter et al. |
| 7,217,214 B2 | 5/2007 | Morscheck |
| 7,234,543 B2 | 6/2007 | Schaaf |
| 7,288,044 B2 | 10/2007 | Gumpoltsberger |
| 7,311,634 B2 | 12/2007 | Shim |
| 7,335,126 B2 | 2/2008 | Tsuchiya et al. |
| 7,347,801 B2 | 3/2008 | Guenter et al. |
| 7,396,309 B2 | 7/2008 | Heitz et al. |
| 7,431,677 B2 | 10/2008 | Miller et al. |
| 7,470,210 B2 | 12/2008 | Miller et al. |
| 7,473,202 B2 | 1/2009 | Morscheck et al. |
| 7,485,069 B2 | 2/2009 | Jang et al. |
| 7,497,798 B2 | 3/2009 | Kim |
| 7,588,514 B2 | 9/2009 | McKenzie et al. |
| 7,637,838 B2 | 12/2009 | Gumpoltsberger |
| 7,672,770 B2 | 3/2010 | Inoue et al. |
| 7,686,729 B2 | 3/2010 | Miller et al. |
| 7,717,815 B2 | 5/2010 | Tenberge |
| 7,727,107 B2 | 6/2010 | Miller |
| 7,780,566 B2 | 8/2010 | Seo |
| 7,874,153 B2 | 1/2011 | Bhem |
| 7,878,935 B2 | 2/2011 | Lahr |
| 7,951,035 B2 | 5/2011 | Platt |
| 7,980,972 B1 | 6/2011 | Starkey et al. |
| 8,029,401 B2 | 10/2011 | Johnson |
| 8,052,569 B2 | 11/2011 | Tabata et al. |
| 8,062,175 B2 | 11/2011 | Krueger et al. |
| 8,066,614 B2 | 11/2011 | Miller et al. |
| 8,142,323 B2 | 3/2012 | Tsuchiya et al. |
| 8,226,518 B2 | 7/2012 | Parraga Gimeno |
| 8,257,216 B2 | 9/2012 | Hoffman |
| 8,257,217 B2 | 9/2012 | Hoffman |
| 8,287,414 B2 | 10/2012 | Weber et al. |
| 8,313,404 B2 | 11/2012 | Carter et al. |
| 8,376,903 B2 | 2/2013 | Pohl et al. |
| 8,382,636 B2 | 2/2013 | Shiina et al. |
| 8,447,480 B2 | 5/2013 | Usukura |
| 8,469,856 B2 | 6/2013 | Thomassy |
| 8,545,368 B1 | 10/2013 | Davis et al. |
| 8,594,867 B2 | 11/2013 | Heap et al. |
| 8,622,871 B2 | 1/2014 | Hoff |
| 8,639,419 B2 | 1/2014 | Roli et al. |
| 8,668,614 B2 | 3/2014 | Sherrill et al. |
| 8,678,975 B2 | 3/2014 | Koike |
| 8,870,711 B2 | 10/2014 | Pohl et al. |
| 8,888,643 B2 | 11/2014 | Lohr et al. |
| 8,926,468 B2 | 1/2015 | Versteyhe et al. |

(56) References Cited

U.S. PATENT DOCUMENTS

| | | | |
|---|---|---|---|
| 8,986,150 B2 | 3/2015 | Versteyhe et al. |
| 9,052,000 B2 | 6/2015 | Cooper |
| 9,114,799 B2 | 8/2015 | Tsukamoto et al. |
| 9,156,463 B2 | 10/2015 | Legner |
| 9,228,650 B2 | 1/2016 | Schoolcraft |
| 9,551,404 B2 | 1/2017 | Ziech et al. |
| 2002/0004438 A1 | 1/2002 | Toukura et al. |
| 2002/0094911 A1 | 7/2002 | Haka |
| 2002/0169048 A1 | 11/2002 | Henzler et al. |
| 2003/0060318 A1 | 3/2003 | Sumi |
| 2003/0181280 A1 | 9/2003 | Elser et al. |
| 2003/0200783 A1 | 10/2003 | Shai |
| 2003/0213125 A1 | 11/2003 | Chiuchang |
| 2003/0216121 A1 | 11/2003 | Yarkosky |
| 2003/0228952 A1 | 12/2003 | Joe et al. |
| 2004/0058769 A1 | 3/2004 | Larkin |
| 2004/0061639 A1 | 4/2004 | Voigtlaender et al. |
| 2004/0166984 A1 | 8/2004 | Inoue |
| 2004/0167391 A1 | 8/2004 | Solar et al. |
| 2004/0171452 A1 | 9/2004 | Miller et al. |
| 2005/0102082 A1 | 5/2005 | Joe et al. |
| 2005/0137046 A1 | 6/2005 | Miller et al. |
| 2005/0153810 A1 | 7/2005 | Miller et al. |
| 2006/0094515 A1 | 5/2006 | Szuba et al. |
| 2006/0234822 A1 | 10/2006 | Morscheck et al. |
| 2006/0276294 A1 | 12/2006 | Coffey et al. |
| 2007/0021259 A1 | 1/2007 | Tenberge |
| 2007/0032327 A1 | 2/2007 | Raghavan et al. |
| 2007/0042856 A1 | 2/2007 | Greenwood |
| 2007/0072732 A1 | 3/2007 | Klemen |
| 2007/0096556 A1 | 5/2007 | Kokubo et al. |
| 2007/0270270 A1 | 11/2007 | Miller et al. |
| 2007/0275808 A1 | 11/2007 | Iwanaka et al. |
| 2008/0039273 A1 | 2/2008 | Smithson et al. |
| 2008/0103002 A1 | 5/2008 | Holmes |
| 2008/0121487 A1 | 5/2008 | Miller et al. |
| 2008/0185201 A1 | 8/2008 | Bishop |
| 2009/0017959 A1 | 1/2009 | Triller |
| 2009/0048054 A1 | 2/2009 | Tsuchiya et al. |
| 2009/0062064 A1 | 3/2009 | Kamada et al. |
| 2009/0112424 A1 | 4/2009 | Dahl et al. |
| 2009/0132135 A1 | 5/2009 | Quinn, Jr. et al. |
| 2009/0221391 A1 | 9/2009 | Bazyn et al. |
| 2009/0221393 A1 | 9/2009 | Kassler |
| 2009/0286651 A1 | 11/2009 | Tanaka et al. |
| 2009/0312137 A1 | 12/2009 | Rohs et al. |
| 2010/0056322 A1 | 3/2010 | Thomassy |
| 2010/0093476 A1 | 4/2010 | Carter et al. |
| 2010/0093479 A1 | 4/2010 | Carter et al. |
| 2010/0106386 A1 | 4/2010 | Krasznai et al. |
| 2010/0113211 A1 | 5/2010 | Schneider et al. |
| 2010/0137094 A1 | 6/2010 | Pohl |
| 2010/0141193 A1 | 6/2010 | Rotondo et al. |
| 2010/0244755 A1 | 9/2010 | Kinugasa et al. |
| 2010/0267510 A1 | 10/2010 | Nichols et al. |
| 2010/0282020 A1 | 11/2010 | Greenwood et al. |
| 2010/0304915 A1 | 12/2010 | Lahr |
| 2010/0310815 A1 | 12/2010 | Mendonca Alves et al. |
| 2011/0015021 A1 | 1/2011 | Maguire et al. |
| 2011/0034284 A1 | 2/2011 | Pohl et al. |
| 2011/0152031 A1 | 6/2011 | Schoolcraft |
| 2011/0165982 A1 | 7/2011 | Hoffman et al. |
| 2011/0165985 A1 | 7/2011 | Hoffman et al. |
| 2011/0165986 A1 | 7/2011 | Hoffman et al. |
| 2011/0165987 A1 | 7/2011 | Hoffman et al. |
| 2011/0230297 A1 | 9/2011 | Shiina et al. |
| 2011/0300954 A1 | 12/2011 | Szuba et al. |
| 2011/0319222 A1 | 12/2011 | Ogawa et al. |
| 2012/0024991 A1 | 2/2012 | Pilch et al. |
| 2012/0035016 A1 | 2/2012 | Miller et al. |
| 2012/0040794 A1 | 2/2012 | Schoolcraft |
| 2012/0122624 A1 | 5/2012 | Hawkins, Jr. et al. |
| 2012/0142477 A1 | 6/2012 | Winter |
| 2012/0165154 A1 | 6/2012 | Wittkopp et al. |
| 2012/0231925 A1 | 9/2012 | Shiina et al. |
| 2012/0244990 A1 | 9/2012 | Ogawa et al. |
| 2012/0309579 A1 | 12/2012 | Miller et al. |
| 2013/0096797 A1 | 4/2013 | Whitney et al. |
| 2013/0130859 A1 | 5/2013 | Lundberg et al. |
| 2013/0133965 A1 | 5/2013 | Books |
| 2013/0184115 A1 | 7/2013 | Urabe et al. |
| 2013/0190131 A1 | 7/2013 | Versteyhe et al. |
| 2013/0226416 A1 | 8/2013 | Seipold et al. |
| 2013/0281244 A1* | 10/2013 | Vaughn .......... F16H 47/04 475/72 |
| 2013/0303325 A1 | 11/2013 | Carey et al. |
| 2013/0304344 A1 | 11/2013 | Abe |
| 2013/0338888 A1 | 12/2013 | Long et al. |
| 2014/0194242 A1 | 7/2014 | Cooper |
| 2014/0194243 A1 | 7/2014 | Versteyhe et al. |
| 2014/0223901 A1 | 8/2014 | Versteyhe et al. |
| 2014/0274536 A1 | 9/2014 | Versteyhe et al. |
| 2014/0274540 A1 | 9/2014 | Schoolcraft |
| 2014/0274552 A1 | 9/2014 | Frink et al. |
| 2014/0329637 A1 | 11/2014 | Thomassy et al. |
| 2015/0024899 A1 | 1/2015 | Phillips |
| 2015/0051801 A1 | 2/2015 | Quinn, Jr. et al. |
| 2015/0111683 A1 | 4/2015 | Versteyhe et al. |
| 2015/0111693 A1 | 4/2015 | Wang et al. |
| 2015/0142281 A1 | 5/2015 | Versteyhe et al. |
| 2015/0159741 A1 | 6/2015 | Versteyhe et al. |
| 2015/0198246 A1 | 7/2015 | Callaway et al. |
| 2015/0204429 A1 | 7/2015 | Versteyhe et al. |
| 2015/0204430 A1 | 7/2015 | Versteyhe et al. |
| 2015/0226294 A1 | 8/2015 | Ziech et al. |
| 2015/0226298 A1 | 8/2015 | Versteyhe et al. |
| 2015/0226299 A1 | 8/2015 | Cooper et al. |
| 2015/0252881 A1 | 9/2015 | Versteyhe |
| 2015/0354676 A1 | 12/2015 | Versteyhe et al. |
| 2016/0033021 A1 | 2/2016 | Cooper et al. |
| 2016/0047448 A1 | 2/2016 | Versteyhe et al. |
| 2016/0069442 A1 | 3/2016 | Versteyhe et al. |
| 2016/0109001 A1 | 4/2016 | Schoolcraft |
| 2016/0116036 A1 | 4/2016 | Schoolcraft |
| 2016/0131235 A1 | 5/2016 | Phillips |
| 2016/0195173 A1 | 7/2016 | Versteyhe et al. |
| 2016/0195177 A1 | 7/2016 | Versteyhe et al. |
| 2016/0319731 A1 | 11/2016 | Versteyhe et al. |
| 2016/0356366 A1 | 12/2016 | Versteyhe et al. |
| 2017/0082049 A1 | 3/2017 | David et al. |
| 2017/0082193 A1 | 3/2017 | David et al. |
| 2017/0089433 A1 | 3/2017 | Stevenson et al. |
| 2017/0089434 A1 | 3/2017 | Waltz et al. |

FOREIGN PATENT DOCUMENTS

| | | |
|---|---|---|
| CN | 101479503 A | 7/2009 |
| CN | 101617146 A | 12/2009 |
| CN | 102297255 A | 12/2011 |
| CN | 102338208 A | 2/2012 |
| CN | 202165536 U | 3/2012 |
| CN | 202392067 U | 8/2012 |
| DE | 1237380 B | 3/1967 |
| DE | 3245045 A1 | 6/1984 |
| DE | 102005010751 A1 | 9/2006 |
| EP | 0156936 A1 | 10/1985 |
| EP | 0210053 A2 | 1/1987 |
| EP | 1061288 A2 | 12/2000 |
| EP | 1174645 A2 | 1/2002 |
| EP | 2113056 B1 | 7/2012 |
| FR | 796188 A | 3/1936 |
| FR | 1030702 A | 6/1953 |
| FR | 1472282 A | 3/1967 |
| FR | 2185076 A5 | 12/1973 |
| FR | 2280451 A1 | 2/1976 |
| FR | 2918433 A1 | 1/2009 |
| GB | 1127825 A | 9/1968 |
| GB | 2196892 A | 5/1988 |
| GB | 2248895 A | 4/1992 |
| JP | H09119506 A | 5/1997 |
| JP | 2008180214 A | 8/2008 |
| JP | 2009058085 A | 3/2009 |
| JP | 2011153583 A | 8/2011 |
| WO | 2006002457 A1 | 1/2006 |

(56) References Cited

FOREIGN PATENT DOCUMENTS

| WO | 2006041718 A2 | 4/2006 |
|---|---|---|
| WO | 2006109158 A1 | 10/2006 |
| WO | 2007046722 A1 | 4/2007 |
| WO | 2007051827 A1 | 5/2007 |
| WO | 2008101070 A2 | 8/2008 |
| WO | 2008103543 A1 | 8/2008 |
| WO | 2011011991 A1 | 2/2011 |
| WO | 2012008884 A1 | 1/2012 |
| WO | 2012177187 A1 | 12/2012 |
| WO | 2013109723 A1 | 7/2013 |
| WO | 2013123117 A1 | 8/2013 |
| WO | 2014039438 A2 | 3/2014 |
| WO | 2014039439 A1 | 3/2014 |
| WO | 2014039440 A1 | 3/2014 |
| WO | 2014039447 A1 | 3/2014 |
| WO | 2014039448 A2 | 3/2014 |
| WO | 2014039708 A1 | 3/2014 |
| WO | 2014039713 A1 | 3/2014 |
| WO | 2014039846 A2 | 3/2014 |
| WO | 2014039900 A1 | 3/2014 |
| WO | 2014039901 A1 | 3/2014 |
| WO | 2014078583 A1 | 5/2014 |
| WO | 2014124291 A1 | 8/2014 |
| WO | 2014151889 A2 | 9/2014 |
| WO | 2014159755 A2 | 10/2014 |
| WO | 2014159756 A2 | 10/2014 |
| WO | 2014165259 A1 | 10/2014 |
| WO | 2014179717 A1 | 11/2014 |
| WO | 2014179719 A1 | 11/2014 |
| WO | 2014186732 A1 | 11/2014 |
| WO | 2014197711 A1 | 12/2014 |
| WO | 2015059601 A1 | 4/2015 |
| WO | 2015073883 A1 | 5/2015 |
| WO | 2015073887 A1 | 5/2015 |
| WO | 2015073948 A2 | 5/2015 |
| WO | 2015195759 A2 | 12/2015 |
| WO | 2015200769 A1 | 12/2015 |
| WO | 2016094254 A1 | 6/2016 |
| WO | 2016168439 A1 | 10/2016 |
| WO | 2016178913 A1 | 11/2016 |
| WO | 2016182838 A1 | 11/2016 |
| WO | 2016205639 A1 | 12/2016 |
| WO | 2017027404 A1 | 2/2017 |

OTHER PUBLICATIONS

Moore, C. A. et al. A Three Revolute Cobot Using CVTs in Parallel, Proceedings of IMECE, 1999, 6 pgs.
Wong. The Temple of VTEC Asia Special Focus on the Multimatic Transmission. Temple of VTEC Asia. Oct. 2000.

* cited by examiner

FIG. 1

$r_i > r_o$
Underdrive

$r_i = r_o$
1:1

$r_i < r_o$
Overdrive

FIG. 8

BALL TYPE CVT WITH OUTPUT COUPLED POWERPATHS

RELATED APPLICATIONS

This application is a divisional application of U.S. Non-Provisional application Ser. No. 14/425,600 filed on Mar. 3, 2015 which is a United States National Phase Application of International Application No. PCT/US/2013/057868, filed on Sep. 3, 2013, which claims the benefit of U.S. Provisional Application No. 61/697,917, filed Sep. 7, 2012 and U.S. Provisional Application No. 61/779,687, filed Mar. 13, 2013, which are incorporated herein by reference.

BACKGROUND OF THE INVENTION

Automatic and manual transmissions are commonly used on automobile vehicles. Those transmissions become more and more complicated since the engine speed has to be adjusted to limit the consumption and the emissions of cars. This finer control of the engine speed in usual transmissions is typically done by adding gears and increasing the overall complexity and cost. 6-speed manual transmissions then become frequent as are 8 or 9 speed automatic transmissions.

SUMMARY OF THE INVENTION

Systems, devices, and methods are provided for the transmission of power, particularly in motor vehicles. According to various embodiments of the disclosure, power can be transmitted in a smoother and more efficient manner, typically with smaller and even less mechanical components, by splitting torque into two or more torque paths. The apparatus described herein, or obvious to one of skill in the art upon reading this disclosure, may be used in a transaxle or any other type of transmission.

An aspect of the disclosure provides an apparatus for transmitting power. This apparatus comprises a power input shaft, a planetary gear set, and a variator, such as a continuously variable transmission (CVT). Aspects of the CVTs are described in US2006084549 or AU2011224083A1, incorporated herein by reference in their entirety. The planetary gear set is engaged with the power input shaft, typically from an internal combustion engine. The variator is engaged with the gear set. The apparatus, and in particular the configuration of the planetary gear set and the variator, is configured to split torque between a first torque path and a second torque path.

The variator may comprise an input ring and an output ring. The planetary gear set may comprise a set of planet gears, a sun gear engaged with the set of planet gears and with the input ring of the variator, a carrier engaged with the power input shaft and with the set of planet gears, and a ring gear engaged with the set of planet gears and with the output ring of the variator. The first torque path may pass from the power input shaft to the carrier, to the planet gears, to the sun gear, to the input ring, to the output ring of the variator, and then to the ring gear of the planetary gear set. The second torque path may pass from the power input shaft to the carrier, to the planet gears, and then to the ring gear of the planetary gear set. In some embodiments, a gear box for outputting power from the apparatus may be coupled to the planetary gear set. The gear box may be coupled to the ring of the planetary gear set and to a differential of a motor vehicle. The gear box may be, for example, a three speed gear box.

Another aspect of the disclosure provides a method of transmitting power. An input shaft, typically from an internal combustion engine, is driven. Torque from the input shaft is split between a first torque path and a second torque path. The first and second torque paths are combined to form a single output (i.e., power-split configuration). The first and second torque paths pass through various components of a planetary gear set and a variator coupled to the planetary gear set as described herein. The variator may comprise a continuously variable transmission (CVT). The first torque path may, for example, pass from the power input shaft to a carrier of the planetary gear set, to planet gears of the planetary gear set, to a sun gear of the planetary gear set, to an input ring of the variator, to an output ring of the variator, and then to a ring gear of the planetary gear set. The second torque path may, for example, pass from the power input shaft to the carrier of the planetary gear set, to the planet gears of the planetary gear set, and then to the ring gear of the planetary gear set.

Yet another aspect of the disclosure provides an apparatus for power transmission. The apparatus comprises a power input shaft, an input planetary gear set engaged with the power input shaft, a variator engaged with the input gear set, an output planetary gear set engaged with the variator, and one or more clutches and brake for switching between a plurality of operational modes of the power transmission apparatus. The apparatus is configured to split torque between a plurality of torque paths.

The variator may comprise an input ring and an output ring, and may be a continuously variable transmission (CVT). The input planetary gear set may comprise a set of input planet gears, an input sun gear engaged with the input planet gears and with the input ring of the variator, an input carrier engaged with the input planet gears and with the power input shaft, and an input ring engaged with the input planet gears. The output planetary gear set may comprise a set of output planetary gears, an output sun gear engaged with the power input shaft and with the output planet gears, an output carrier engaged with the output planet gears and with a gear box for outputting power from the apparatus, and an output ring engaged with the output planet and with the output ring of the variator. The power transmission apparatus may further comprise a counter shaft engaging the input ring and the output ring gears of the two planetary gear sets. The one or more clutches may comprise a first clutch and a second clutch. The first clutch may be configured to be engaged to engage the output sun gear with the output ring of the variator. The second clutch may be configured to be engaged to engage the power input shaft with the output sun gear. The power transmission apparatus may further comprise a brake for holding the output sun to achieve an additional operation mode of the power transmission apparatus. The power transmission apparatus may further comprise a gear box, such as a three speed gear box, coupled to the output carrier of the output planetary gear set as well as to a differential of a motor vehicle.

The plurality of operational modes of the power transmission apparatus may comprise a first mode, a second mode, and a third mode. The first, second, and third modes may comprise various continuously variable transmission (CVT) modes. The first mode may be selected by engaging the brake while releasing the first and second clutch. The second mode may be selected by engaging the second clutch while releasing the brake and the first clutch. The third mode may be selected by engaging the first clutch while releasing the brake and the second clutch.

In this embodiment, torque may be split into two paths—a first path through the variator and a second path through the countershaft in the first and third modes. Torque may also instead be split into three paths—a first path through the variator, a second path through the countershaft, and a third path between the power input shaft and the output sun gear of the output planetary gear set in the second mode.

Provided herein is a vehicle comprising the power transmission apparatus of any of embodiment described herein, or obvious to one of skill in the art upon reading the disclosures herein. Embodiments of the power transmission apparatus (variable transmission) described herein or that would be obvious to one of skill in the art upon reading the disclosure herein are contemplated for use in a variety of vehicle drivelines. For non-limiting example, the variable transmissions disclosed herein may be used in bicycles, mopeds, scooters, motorcycles, automobiles, electric automobiles, trucks, sport utility vehicles (SUV's), lawn mowers, tractors, harvesters, agricultural machinery, all terrain vehicles (ATV's), jet ski's, personal watercraft vehicles, airplanes, trains, helicopters, buses, forklifts, golf carts, motorships, steam powered ships, submarines, space craft, or other vehicles that employ a transmission.

While the figures and description herein are directed to ball-type variators (CVTs), alternate embodiments are contemplated another version of a variator (CVT), such as a Variable-diameter pulley (VDP) or Reeves drive, a toroidal or roller-based CVT (Extroid CVT), a Magnetic CVT or mCVT, Ratcheting CVT, Hydrostatic CVTs, Naudic Incremental CVT (iCVT), Cone CVTs, Radial roller CVT, Planetary CVT, or any other version CVT.

In some embodiments, the power transmission apparatus further comprises a traction fluid.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Besides automatic and manual transmissions commonly used on automobile vehicles are developed Continuously Variable Transmissions or CVTs. Those CVTs are of many types: belts with variable pulleys, toroidal, conical, etc. The principle of a CVT is that it enables the engine to run at its most efficient rotation speed by changing steplessly the transmission ratio in function of the speed of the car. If needed for example when accelerating, the CVT can also shift to a ratio providing more power. A CVT can change the ratio from the minimum to the maximum ratio without any interruption of the power transmission, at the opposite of usual transmissions which require an interruption of the power transmission by disengaging to shift of ratio. A specific use of CVTs is the Infinite Variable Transmission or IVT. Where the CVT is limited at positive speed ratios, the IVT configuration can perform a neutral gear and even reverse steplessly. A CVT can be used as an IVT in some driveline configurations.

In many currently used motor vehicle transmissions, including manual transmissions, automatic transmissions, and CVTs, power and torque are not transmitted in a smooth or efficient manner. This can reduce fuel efficiency and can result in an unsmooth ride. Therefore, improved motor vehicle transmissions for smooth and efficient power and torque transmission are desired.

Figure 1:
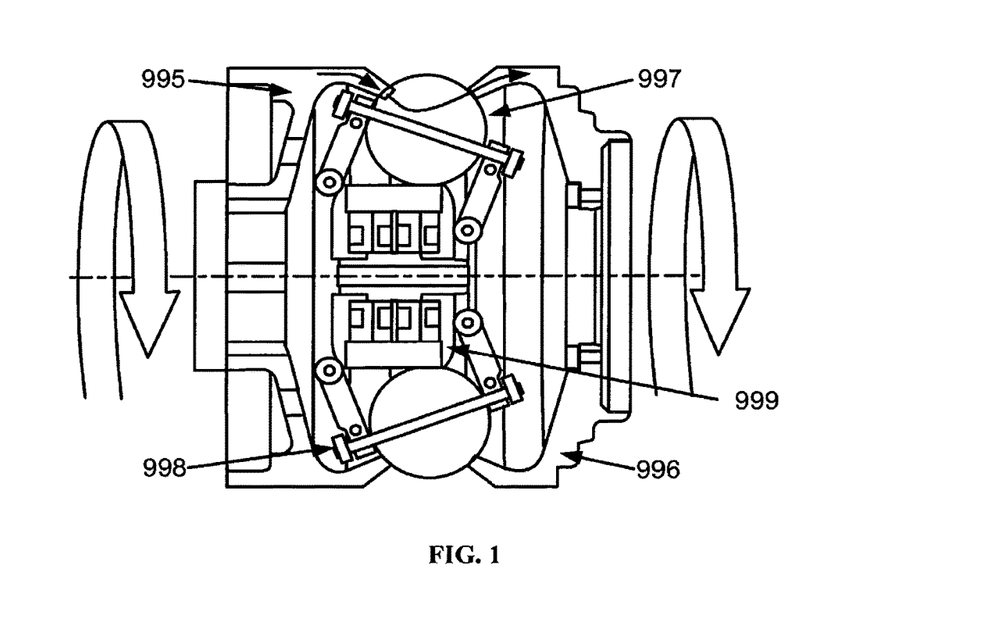
FIG. 1 is a side sectional view of a continuously variable planetary (CVP) variator.

Within this disclosure, we introduce new driveline configurations based on a ball type CVT, also known as CVP, for constant variable planetary, for which Fallbrook Technologies, Inc. has applied for patents under the references US20060845449P and AU2011224083A1. This CVT comprises of a certain number of balls 997 (for example, 3-15 balls), depending on the application, two discs 995, 996 with a conical surface contact with the balls 997, as input 995 and output 996, and an idler 999 as shown on FIG. 1. The balls are mounted on axles 998, themselves hold in a cage or carrier allowing changing the ratio by tilting the ball's axes. An idler 999 sits below the balls in the cage. Other types of ball CVTs also exist, such as the one produced by Milner but are slightly different.

Figure 2:
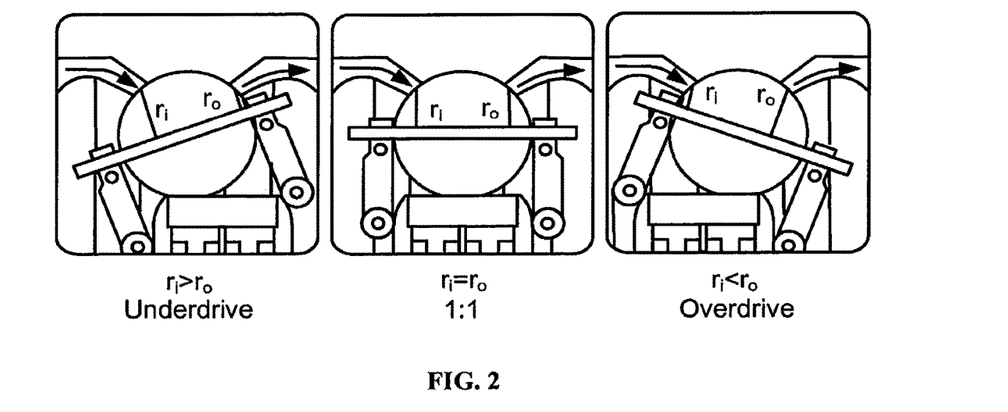
FIG. 2 is a magnified, side sectional view of a ball and ring of the CVP variator of FIG. 1.

The working principle is shown on FIG. 2. The CVP itself works with a traction fluid. The lubricant between the ball and the conical rings acts as solid at high pressure, transferring the power from the input ring, through the balls, to the output ring. By tilting the ball's axles, the ratio can be changed between input and output. When the axis is horizontal the ratio is one (1:1), when the axis is tilted the distance between the axis and the contact point change, modifying the overall ratio (input radius>output radius=underdrive; input radius<output radius=overdrive). All the ball's axles are tilted at the same time with a mechanism included in the cage.

Figure 3:
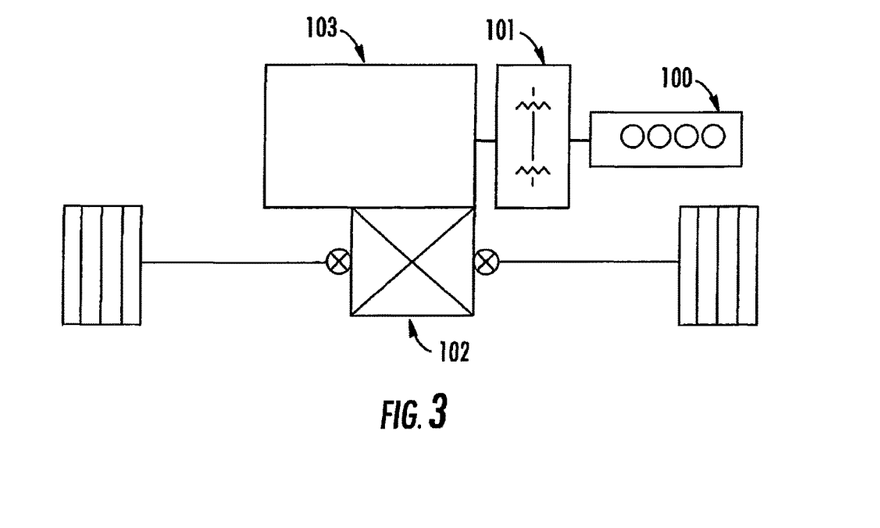
FIG. 3 is a block diagram of a continuously variable transmission (CVT) used in an automobile.

In a car, the CVT 103 includes a CVP (continuously variable planetary) and is used to replace traditional transmission and is located between the engine 100 and the differential 102 as shown on FIG. 3. A torsional damper 101 has to be introduced between the engine and the CVT 103 to avoid transferring torque peaks and vibrations that could seriously damage the CVT 103. In some configurations, this damper 101 can be coupled with a clutch for the starting function.

Figure 4:
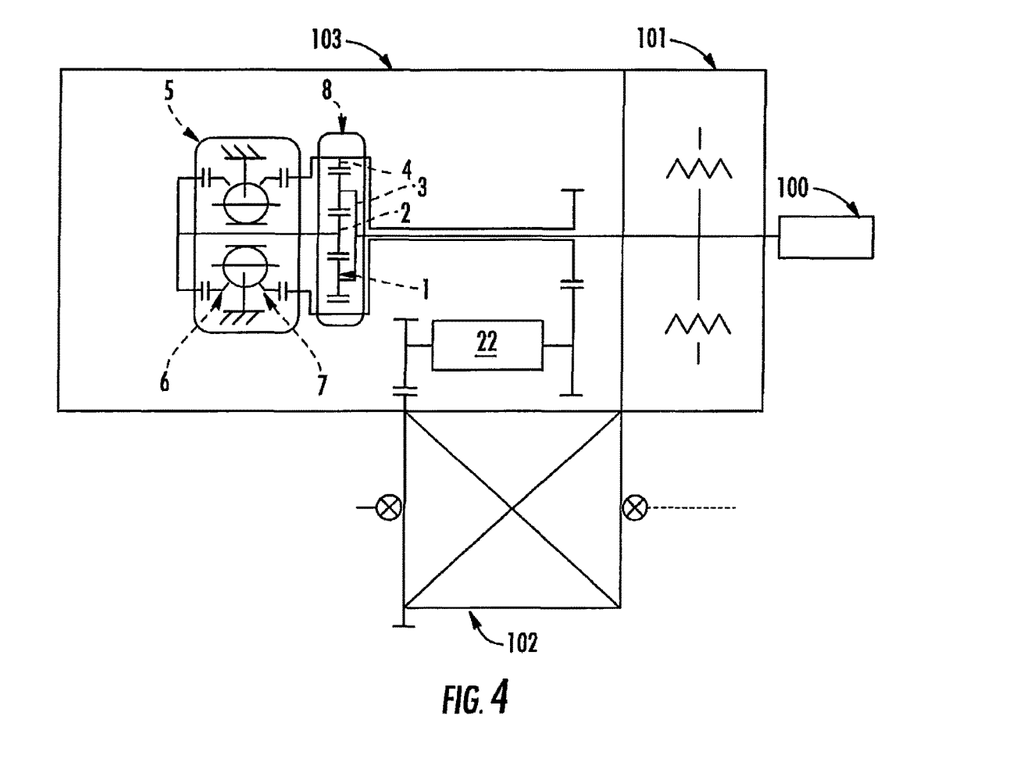
FIG. 4 is a block diagram of a continuously variable transmission (CVT) according to an embodiment of the present disclosure used in an automobile.

One configuration depicted in FIG. 4 uses a planetary gearset 8 to split the torque between two different paths. A part of the power will pass through the CVP 5 while the other part of it will pass directly from the planetary gearset 8 to the output through a mechanical path with higher efficiency. This power splitting allows a relatively small CVP and increases the native efficiency of the transmission. The central part of that configuration is the variator 5 described previously in the document. A ball ramp on each side of the variator provides the clamping force necessary to transfer the torque.

This configuration uses only one mode performing CVP function. To extend the speed range in the low speed and reverse area, a three speed gearbox 22 can be added after the CVP. Since this configuration does not have an IVP mode, a slipping clutch or a torque converter is optionally used to allow the start from standstill.

The internal combustion engine (ICE) is linked to the carrier 3 which in turn is linked to the planets 1 of the planetary gearset 8. The sun 2 of the planetary gearset 8 is connected to the variator input ring 6. The ring 4 of the planetary gearset 8 is linked to the variator output ring 7. This common ring 7 is connected to a three speed gearbox increasing the spread and allowing higher reverse speeds.

Figure 5:
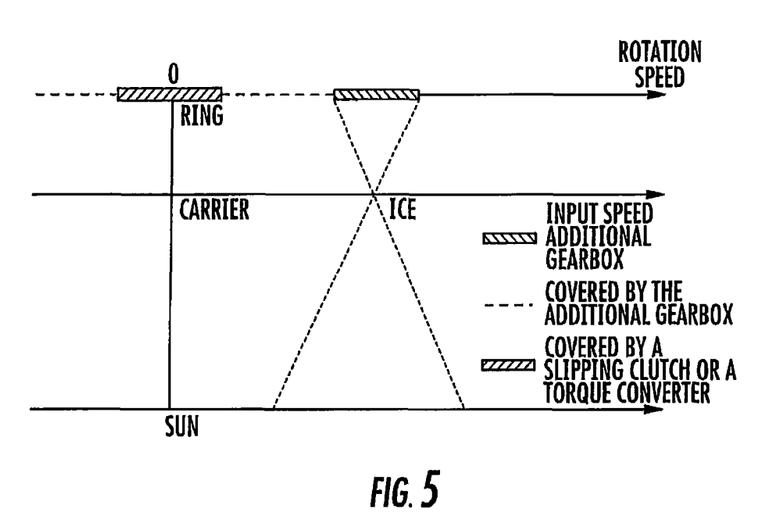
FIG. 5 is a graph of a speed diagram of the CVT of FIG. 4.

FIG. 5 shows the speed diagram of the planetary gearset 8. The three horizontal axes represent respectively, from the bottom to the top, the sun rotation speed, the carrier rotation speed and the ring rotation speed. The carrier is the input and typically always turns at ICE speed. The ring is the output and is linked to a three speed gearbox. The output speed achievable is noted on the top horizontal axis in diagonal shading between the two dotted diagonal lines. The dashed area noted on the top horizontal axis can be covered by the additional gearbox. The dotted area noted on the top horizontal axis has to be covered by a slipping clutch or a torque converter.

This device is able to change continuously its ratio to provide the best ratio achievable for the engine in function of the objectives of consumption or power. In a manual or automatic transmission, only some predetermined and discrete ratios are available and an interruption of the power transmission is needed to shift of ratio. Generally, the power interruptions in this device only occur during gear shifting of the additional gearbox. Other advantages of this configuration are that a very small variator can be chosen; spread is similar to a traditional gearbox if an additional (smaller) gearbox is added and the native efficiency of the transmission is increased by using the CVP in a powersplit device, therefore letting a part of the power passing through a more efficient mechanical path. Native efficiency will be high, because the variator input ring is connected to the sun, where the torque is lower, so more power is transmitted through the mechanical path (the ring).

Another embodiment configuration (depicted in FIG. 6) uses two planetary gearsets (input planetary gearset 10, output planetary gearset 12) to split the torque between different paths. The input planetary gearset 10 includes a planet 1a, a sun 2a, a carrier 3a, and a ring 4a. Similarly, the output planetary gearset 12 includes a planet 1b, a sun 2b, a carrier 3b, and a ring 4b. A part of the power will pass through the CVP 5 while the other part of it will pass to the output through a mechanical path with higher efficiency. Two clutches (first clutch 16, second clutch 18) and one brake 14 may be needed to have three different CVP modes. This power splitting allows to have a smaller CVP and to increase the native efficiency of the transmission. The central part of that configuration is the variator described previously in the document. A ball ramp on each side of the variator provides the clamping force necessary to transfer the torque.

Figure 6:
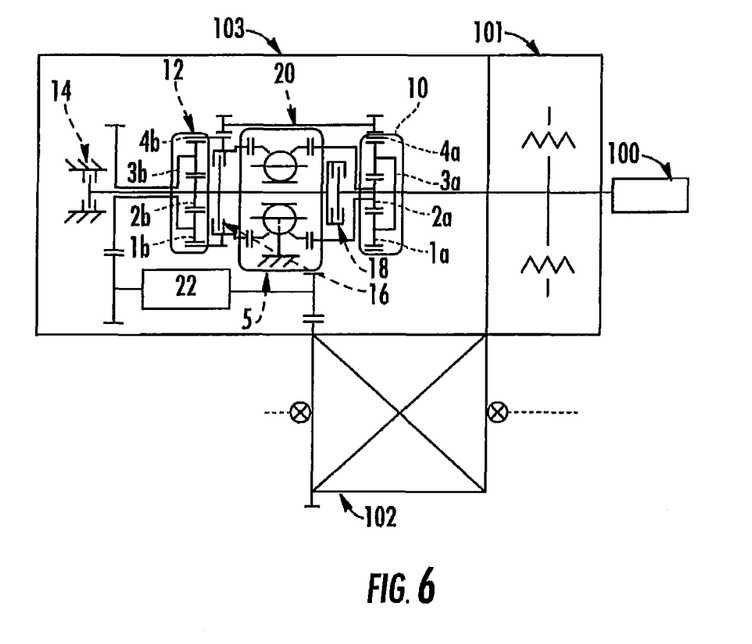
FIG. 6 is a block diagram of a continuously variable transmission (CVT) according to another embodiment of the present disclosure used in an automobile.

There exist three modes performing a CVP function. To allow forward low speeds and reverse speeds, a three speed gearbox is added after the CVP. Since this configuration does not have an IVP mode, a slipping clutch or a torque converter can be used to allow starting from standstill and low speeds.

The ICE is linked to the carrier 3a of the input planetary gearset 10 and can be linked to the sun 2 of the output planetary gearset 12 through a second clutch 18. The sun 2a of the input planetary gearset 10 is linked to the variator input ring while the variator output ring is connected to the ring 4b of the output planetary gearset 12. Both rings 4a, 4b of the two planetaries gearsets 10, 12 respectively are linked by means of a countershaft 20. The variator output ring can also be connected to the output planetary sun 2b by engaging a first clutch 16. A brake 14 allows holding the output planetary sun 2b to perform an additional mode. The output is made by the carrier 3b of the output planetary and is directly linked to an additional three speed gearbox 22.

The three modes are selected by engaging one of the two clutches 16, 18 or brake 14 and releasing the two others. The first mode (CVP1) is obtained by engaging the brake 14, thus holding the sun 2b of the output planetary gearset 12 fixed. The second mode (CVP2) is selected by engaging the second clutch 18 and releasing the others, while the third mode (CVP3) is selected by engaging the first clutch 16. In the first and third mode, a part of the power is passing through the CVP 5 and a part of it is passing through the countershaft 20. In the second mode (CVP2), an additional power path is created between the ICE and the sun 2b of the output planetary gearset 12, thus splitting the power twice. The output planetary gearset 12 combines those different paths to a single output on its carrier 3b.

Figure 7:
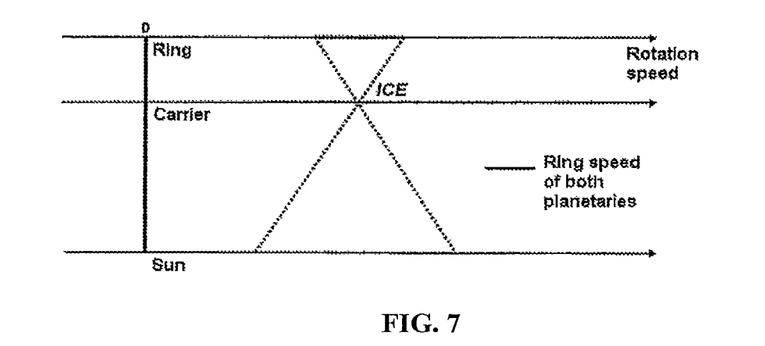
FIG. 7 is a graph of a speed diagram of an input planetary gear of the CVT of FIG. 6.

FIG. 7 shows the speed diagram of the input planetary gearset 10. The three horizontal axes represent respectively, from the bottom to the top, the sun 2a rotation speed, the carrier 3a rotation speed and the ring 4a rotation speed. The carrier a of the input planetary gearset 10 is directly connected to the ICE. The ring 4a speed is determined in function of the CVP ratio and is then directly applied to the output planetary ring 4 b through the countershaft 20.

Figure 8:
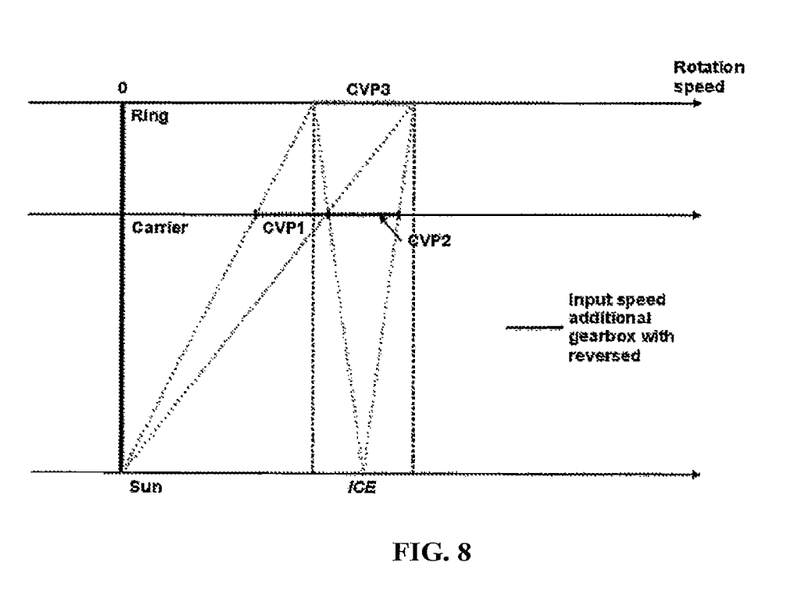
FIG. 8 is a graph of a speed diagram of an output planetary gear of the CVT of FIG. 6 in its different modes.

FIG. 8 shows the speed diagram of the output planetary gearset 12 for the three modes. This figure shows for mode CVP1, the sun 2b is held by the brake 14 and the output speed achievable can be observed on the carrier 3b axis. Mode CVP2 is selected by connecting the sun 2b of the output planetary gearset 12 to the ICE. The output speed achievable by doing this is shown on the carrier 3b axis with the text CVP2. Finally, mode CVP3 is engaged by linking the sun 2b and the ring 4b of the output planetary gearset 12. The output planetary gearset 12 is then turning as a whole and the output speed equals the ring 4 b speed.

An additional gearbox 22 is added to increase the spread, allowing lower forward speeds and reverse. Since this concept has not an IVP function, a slipping clutch or a torque converter may be needed to start from standstill and to have very low driving speeds.

The transition between the three modes can simply be done by closing one of the clutches 16, 18 or brake 14 and releasing the others. This device is able to change continuously its ratio to provide the best ratio achievable for the engine in function of the objectives of consumption or power. In a manual or automatic transmission, only some predetermined and discrete ratios are available and an interruption of the power transmission is needed to shift of ratio. Generally, the power interruptions in this device only occur during gear shifting of the additional gearbox 22. Other advantages of this configuration are that a very small variator can be chosen; spread is similar to a traditional gearbox if an additional (smaller) gearbox is added and the native efficiency of the transmission is increased by using the CVP in a powersplit device, therefore letting a part of the power passing through a more efficient mechanical path. Native efficiency will be high, because the variator input ring is connected to the sun 2a, where the torque is lower, so more power is transmitted through the mechanical paths. An additional feature of this configuration is that in CVP 2 mode, powersplitting occurs two times.

Provided herein is a vehicle comprising the power transmission apparatus of any of embodiment described herein, or obvious to one of skill in the art upon reading the disclosures herein. Embodiments of the power transmission apparatus (variable transmission) described herein or that would be obvious to one of skill in the art upon reading the disclosure herein are contemplated for use in a variety of vehicle drivelines. For non-limiting example, the variable transmissions disclosed herein may be used in bicycles, mopeds, scooters, motorcycles, automobiles, electric automobiles, trucks, sport utility vehicles (SUV's), lawn mowers, tractors, harvesters, agricultural machinery, all terrain vehicles (ATV's), jet ski's, personal watercraft vehicles, airplanes, trains, helicopters, buses, forklifts, golf carts, motorships, steam powered ships, submarines, space craft, or other vehicles that employ a transmission.

While the figures and description herein are directed to ball-type variators (CVTs), alternate embodiments are contemplated another version of a variator (CVT), such as a Variable-diameter pulley (VDP) or Reeves drive, a toroidal or roller-based CVT (Extroid CVT), a Magnetic CVT or mCVT, Ratcheting CVT, Hydrostatic CVTs, Naudic Incremental CVT (iCVT), Cone CVTs, Radial roller CVT, Planetary CVT, or any other version CVT.

In some embodiments, the power transmission apparatus further comprises a traction fluid.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed:

1. An apparatus for power transmission comprising:
a power input shaft;
a planetary gear set engaged with the power input shaft; and
a ball type variator including an input ring and an output ring engaged with the gear set,
wherein the apparatus is configured to split torque between a first torque path and a second torque path, wherein the ball-type variator comprises a plurality of balls in contact with the input ring and the output ring, each ball provided with a tiltable axis of rotation, wherein a speed of the output ring is continuously variable corresponding to movement of the tiltable axis of rotation, wherein the planetary gear set comprises a set of planet gears, a sun engaged with the set of planet gears and to the input ring of the variator, a carrier engaged with the power input shaft and with the set of planet gears, and a ring gear engaged with the set of planet gears and with the output ring of the variator, and
wherein the first torque path transmits rotational power passes from the power input shaft to the carrier of the planetary gear set, to the planet gears of the planetary gear set, to the sun gear of the planetary pear set, to the input ring of the variator, to the output ring of the variator, and then to the ring gear of the planetary gear set.

2. The power transmission apparatus of claim 1, wherein the second torque path passes from the power input shaft to the carrier of the planetary gear set, to the planet gears of the planetary gear set, and then to the ring gear of the planetary gear set.

3. The power transmission apparatus of claim 1, further comprising a gear box for transmitting an output power from the apparatus, the gear box being coupled to the planetary gear set.

4. The power transmission apparatus of claim 3, wherein the gear box is coupled to the ring gear of the planetary gear set.

5. The power transmission apparatus of claim 3, wherein the gear box is coupled to a differential.

6. The power transmission apparatus of claim 5, wherein the gear box comprises a three speed gear box.

7. The power transmission apparatus of claim 1 further comprising a traction fluid lubricant.

8. A vehicle comprising the power transmission apparatus of claim 1.

9. A method of transmitting power comprising:
driving an input shaft;
splitting torque from the input shaft between a first torque path and a second torque path; and
combining the first and second torque paths to form a single output,
wherein the first and second torque paths pass through a planetary gear set and the first torque path passes through a ball type variator coupled to the planetary gear set,
wherein the ball-type variator comprises a plurality of balls in contact with an input ring and an output ring, each ball provided with a tiltable axis of rotation, wherein a speed of the output ring is continuously variable corresponding to movement of the tiltable axis of rotation, and
wherein splitting torque further comprises transmitting rotational power through the first torque path, wherein the first torque path corresponds to power transmission from the power input shaft to a carrier of the planetary gear set, to a set of planet gears of the planetary gear set, to a sun gear of the planetary gear set, to an input ring of the variator, to the output ring of the variator, and then to a ring gear of the planetary gear set.

10. The power transmission method of claim 9, wherein splitting torque further comprises transmitting rotational power through the second torque path, wherein the second torque path corresponds to power transmission from the power input shaft to a carrier of the planetary gear set, to a set of planet gears of the planetary gear set, and then to a ring gear of the planetary gear set.

11. An apparatus for power transmission comprising:
a power input shaft;
a planetary gear set engaged with the power input shaft; and a ball type variator including an input ring and an output ring engaged with the gear set, wherein the apparatus is configured to split torque between a first torque path and a second torque path, wherein the ball-type variator comprises a plurality of balls in contact with the input ring and the output ring, each ball provided with a tiltable axis of rotation, wherein a speed of the output ring is continuously variable corresponding to movement of the tiltable axis of rotation, wherein the planetary gear set comprises a set of planet gears, a sun engaged with the set of planet gears and to the input ring of the variator, a carrier engaged with the power input shaft and with the set of planet gears, and a ring gear engaged with the set of planet gears and with the output ring of the variator, and wherein the second torque path passes from the power input shaft to the carrier of the planetary gear set, to the planet gears of the planetary gear set, and then to the ring gear of the planetary gear set.

* * * * *

UNITED STATES PATENT AND TRADEMARK OFFICE
CERTIFICATE OF CORRECTION

PATENT NO. : 10,088,026 B2
APPLICATION NO. : 15/423131
DATED : October 2, 2018
INVENTOR(S) : Mark R. J. Versteyhe and Matthias W. J. Byltiauw Page 1 of 1

It is certified that error appears in the above-identified patent and that said Letters Patent is hereby corrected as shown below:

In the Claims

In Claim 1, Column 8, Line 9, please amend "to the sun gear of the planetary pear set" to "to the sun gear of the planetary gear set".

Signed and Sealed this
Twenty-seventh Day of November, 2018

Andrei Iancu
*Director of the United States Patent and Trademark Office*